(12) United States Patent
Chen

(10) Patent No.: US 10,236,004 B2
(45) Date of Patent: Mar. 19, 2019

(54) DATA ENCODING AND DECODING METHOD AND SYSTEM

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Chun-Hung Chen, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/473,788

(22) Filed: Mar. 30, 2017

(65) Prior Publication Data

US 2018/0082696 A1  Mar. 22, 2018

(30) Foreign Application Priority Data

Sep. 19, 2016 (CN) .......................... 2016 1 0829740

(51) Int. Cl.
*G10L 19/018* (2013.01)
*G06F 21/60* (2013.01)
*G10L 19/008* (2013.01)

(52) U.S. Cl.
CPC .......... *G10L 19/018* (2013.01); *G06F 21/602* (2013.01); *G06F 21/606* (2013.01); *G10L 19/008* (2013.01)

(58) Field of Classification Search
None
See application file for complete search history.

(56) References Cited

U.S. PATENT DOCUMENTS

| 9,313,359 B1* | 4/2016 | Stojancic ................. H04N 1/32 |
| 2004/0078205 A1 | 4/2004 | Liljeryd et al. |
| 2007/0225971 A1 | 9/2007 | Bessette |
| 2009/0276212 A1 | 11/2009 | Khalil et al. |
| 2012/0185069 A1* | 7/2012 | Wu ........................ G10L 19/018 700/94 |
| 2012/0269352 A1* | 10/2012 | Wu ........................ G10L 19/018 381/22 |
| 2013/0185062 A1 | 7/2013 | Krishnan et al. |

FOREIGN PATENT DOCUMENTS

| CN | 101494049 A | 7/2009 |
| CN | 103106901 A | 5/2013 |

* cited by examiner

Primary Examiner — James K Mooney
(74) Attorney, Agent, or Firm — ScienBiziP, P.C.

(57) ABSTRACT

A method of hiding non-audio data in audio data of multiple audio channels which can be applied to first and second audio channel. Audio data segments from the audio data of the multiple audio channels are retrieved and pairs of target audio data segments associated with the first channel and the second channel are selected. The target audio data segments are divided into a plurality of audio frames based on sampling points. An entropic value of each of the audio frames is calculated and the audio data of the audio frames is adjusted to embed the non-audio data into the calculated and recorded entropic differences within the pairing of audio frames respectively associated with the first and second audio channels.

8 Claims, 4 Drawing Sheets

DATA ENCODING AND DECODING METHOD AND SYSTEM

FIELD

The subject matter herein generally relates to communication security technologies.

BACKGROUND

Data can be hidden into a multimedia file through a time domain (TD) or a frequency domain (FD), or is hidden in a discrete wavelet transform (DWT) coefficient or a discrete cosine transform (DCT) coefficient in a form of plain text or cipher text. However, the above described methods are complex and the integrity of the hidden data is easily affected by noise.

BRIEF DESCRIPTION OF THE DRAWINGS

Implementations of the present technology will now be described, by way of example only, with reference to the attached figures, wherein.

DETAILED DESCRIPTION

Figure 1:
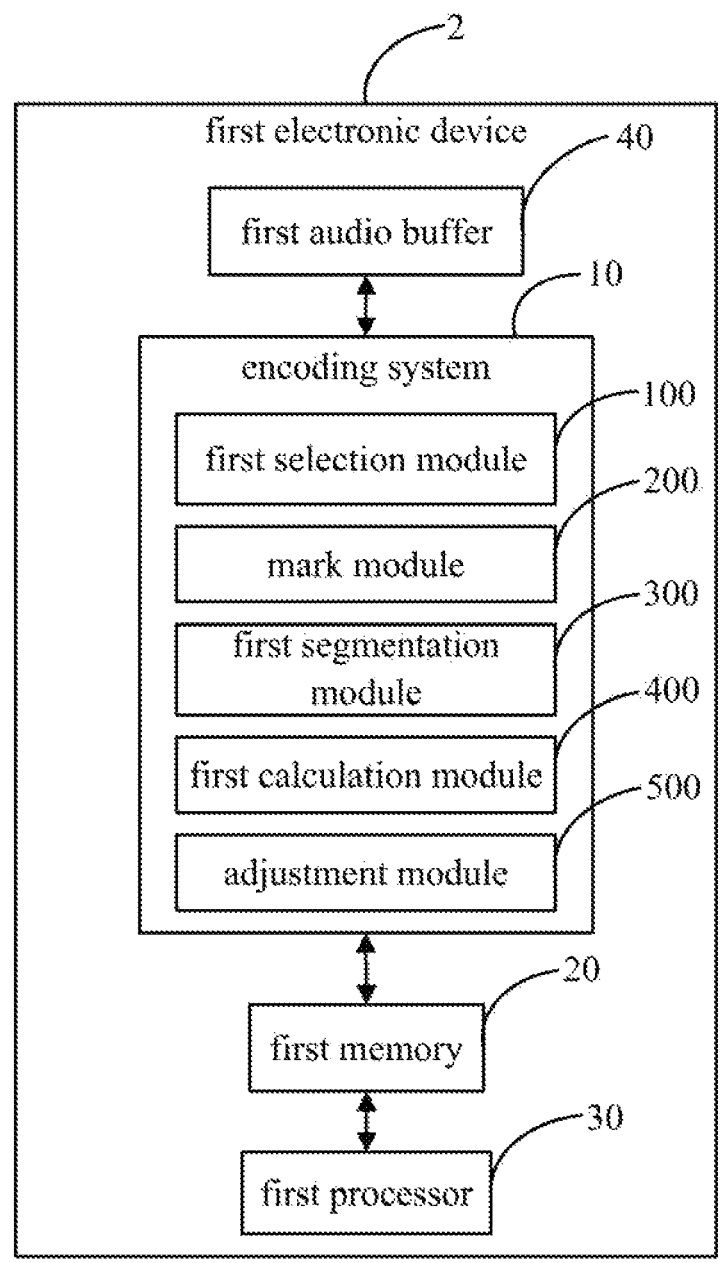
FIG. 1 is a block diagram of an exemplary embodiment of functional modules of an encoding system in a first electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of an exemplary embodiment described herein. However, it will be understood by those of ordinary skill in the art an exemplary embodiments described herein can be practiced without these specific details. In other instances, methods, procedures, and components have not been described in detail so as not to obscure the related relevant feature being described. Also, the description is not to be considered as limiting the scope of an exemplary embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates an exemplary embodiment of functional modules of an encoding system 10. The encoding system 10 is executed by a first electronic device 2. The electronic device 2 comprises a first memory 20, a first processor 30, and a first audio buffer 40. The first audio buffer 40 is configured to store pre-processed audio data of multiple audio channels.

The encoding system 10 processes audio data of multiple audio channels. The multiple audio channels comprise at least two channels, such as a first channel and a second channel. In an exemplary embodiment, the encoding system 10 processes the audio data of the multiple audio channels in the first audio buffer 40 on the basis of data to be hidden. The to-be-hidden data is inserted into entropic differences of first audio data segments associated with the first channel and second audio data segments associated with the second channel. The to-be-hidden data may be associated with a device by which the audio data is downloaded, such as an identifier, a media access control address, user information, a download time, and a communication password of the device, and the like.

The encoding system 10 comprises a first selection module 100, a mark module 200, a first segmentation module 300, a first calculation module 400, and an adjustment module 500. The modules 100-500 can be executed by one or more processors (for example the processor 30) to achieve functionality. The memory 20 can store code and data of the encoding system 10.

The first selection module 100 retrieves audio data segments from pre-processed audio data of multiple audio channels, in which the audio data segments are composed of the first audio data segments associated with the first channel and the second audio data segments that are associated with the second channel. The first and second audio data segments correspond to each other and entropic difference of the first and second audio data segments equals a first pre-defined threshold. Then, the first selection module 100 selects at least one pair of target audio data segments from the retrieved audio data segments. The pair of target audio data segments comprise a first target audio data segment associated with the first channel and a second target audio data segment associated with the second channel. To achieve selection, the respective entropic values of the first and second audio data segments are compared. In the pair of target audio data segments, where the entropic differences between the first and second target audio data segments equal a second pre-defined threshold, the first and second target audio data segments are considered similar.

The pre-processed audio data of each channel is stored in the first audio buffer 40. In an exemplary embodiment, the multiple audio channels can be two audio channels (left audio channel and right audio channel), 5.1 audio channels, 7.1 audio channels, or other.

For instance, the first determination module 100 extracts the audio data of the first channel and the second channel from the first audio buffer 40 and retrieves the audio data segments of the two channels by detecting short-time zero-crossing rate of the audio data. Then, the first selection module 100 calculates respective entropic values of the first and second target audio data segments and compares such values to select at least one pair of target audio data segments for hiding the data. In the pair of target audio data segments, the entropic differences may equal a second pre-defined threshold of similarity which may be 97% for example. In an exemplary embodiment, the target audio data segments of two channels are selected by comparing similarity of waveforms or the similarity of frequency domain values of the two channels.

The mark module 200 marks the pair of target audio data segments of the first channel and the second channel, the first channel, and the second channel. The first channel is used for hiding data, and the second channel is used for comparison purposes.

In an exemplary embodiment, the mark module 200 inserts synchronous marker fields into the first and second target audio data segments. A marker field includes a data hiding bit and an original audio bit. The data hiding bit marks the first and second target audio data segments, and the original audio bit marks the first channel and the second channel. The marker field can be one or more frames, or a marker string (e.g., a command).

The first segmentation module 300 divides the first target audio data segments into a plurality of first audio frames according to first-preset-number sampling points. Similarly, the second target audio data segment is divided into a plurality of second audio frames according to the first-preset-number sampling points. The calculation module 400 calculates a first entropic value of each first audio frame and a first entropic value of each second audio frame.

The adjustment module 500 adjusts first audio data of the first audio frames or second audio data of the second audio frames to embed the to-be-hidden data in entropic differences between the first audio frames and the second audio frames according to the first entropic values.

In an exemplary embodiment, the first segmentation module 300 divides the first target audio data segments with marker into a plurality of first audio frames according to the first-preset-number sampling points. The second target audio data segments with marker are divided into a plurality of second audio frames according to the same number of sampling points. The calculation module 400 calculates the first entropic value of each first audio frame and the first entropic value of each second audio frame.

The entropic difference between two audio frames is small. The adjustment module 500 can thus set a threshold to determine whether there is entropic difference of the first audio frame and the second audio frame. For instance, the first target audio data segment includes four first audio frames, and each of the first audio frames has a value of 1.3, 1.4, 1.5, and 1.4. The second target audio segment also includes four second audio frames, and each of the first audio frames has a value of 1.3, 1.4, 1.5, and 1.4. Each of the first and second audio frames includes six sampling points. The adjustment module 500 sets 0.2 as the threshold, and the difference is recorded as "0" if entropic difference between the first audio frames and the second audio frame is less than or equal to 0.2. Otherwise, the difference is recorded as "1". The "0" means there is no significant difference in entropy between the first and second audio frames, and the "1" is opposite.

Before being hidden, the data is modulated as a form composed of the "1" digits and the "0" digits. For producing appropriate entropic differences of pairs of audio frames of the second channel and the first channel, the adjustment module 500 adjusts the first audio data of the six sampling points of the first channel marked by the mark module 200 according to the modulated data and the entropic values of the first audio frames and the second audio frames calculated by the calculation module 400. The selection module 100 determines whether each entropic difference of each pair of the audio frames is "0" or "1" according to the rules. Thus, where the threshold is set at 0.2, the difference is recorded as "0" if the entropic difference between the first and second audio frames is less than or equal to 0.2, otherwise, the difference is recorded as "1". Finally, the combination of all of the determinations is the modulated data.

The processed audio data segments of the first channel replace original audio segments of the first channel, and the processed audio data segments of the second channel replace the original audio segments of the second channel, in the first audio buffer 40.

Figure 2:
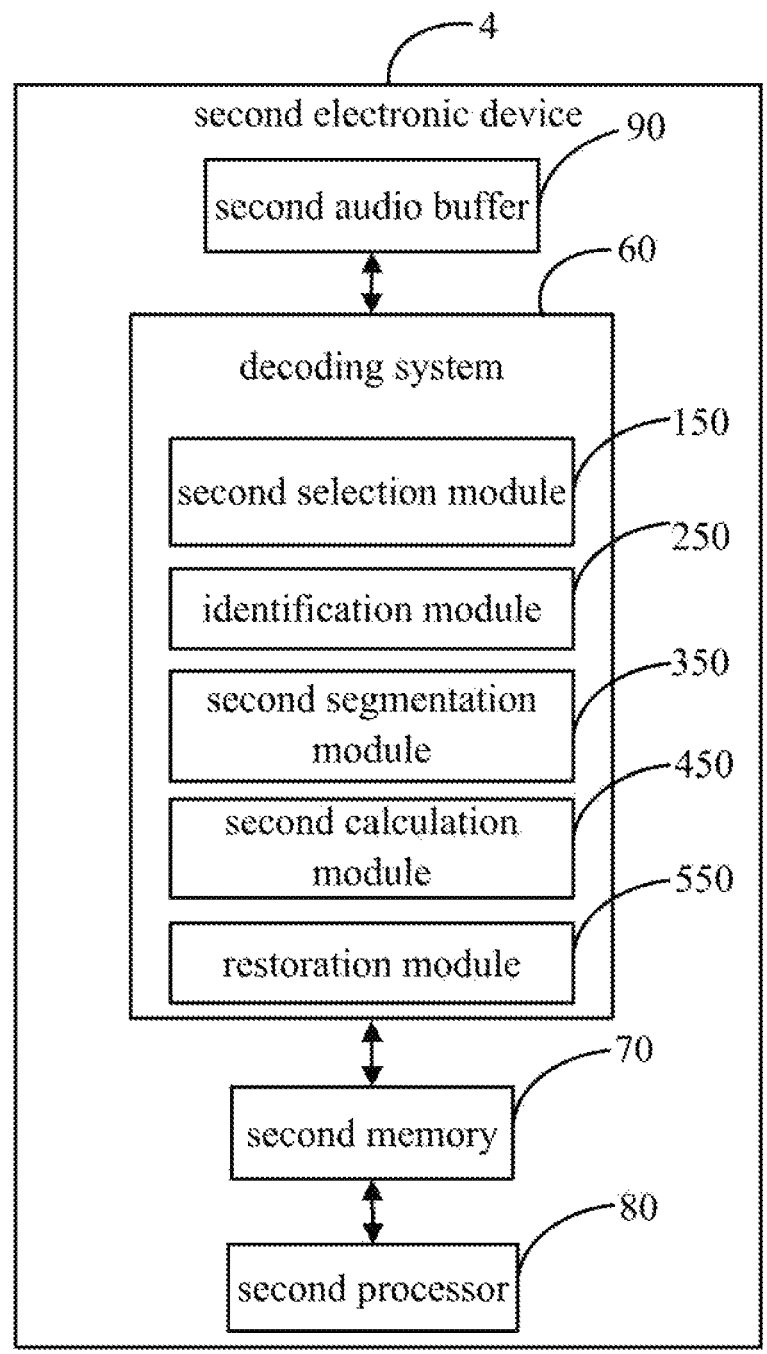
FIG. 2 is a block diagram of an exemplary embodiment of functional modules of a decoding system in a second electronic device.

FIG. 2 is an exemplary embodiment of functional modules of a decoding system 60. The decoding system 60 is executed by a second electronic device 4. The second electronic device 4 comprises a second memory 70, a second processor 80, and a second audio buffer 90. The second audio buffer 90 is configured to store pre-processed audio data of multiple audio channels.

The decoding system 60 processes the audio data in the second audio buffer 90 to restore the hidden data in the two channels. The decoding system 60 comprises a second selection module 150, an identification module 250, a second segmentation module 350, a second calculation module 450, and a restoration module 550. The modules 150-550 can be executed by one or more processors (for example the processor 80) to achieve functionality. The memory 70 can store code and data of the decoding system 60.

The second selection module 150 retrieves the audio data segments from the pre-processed audio data of the multiple audio channels. Then the second selection module 150 identifies the marker fields in the first and second target audio data segments according to a preset marker field format. The pre-processed audio data of each channel is stored in the second audio buffer 90.

The following description applies to marker fields in a pair of target audio data segments composed of a first audio data segment and a second audio data segment, as identified by second selection module 150.

According to the marker fields, the identification module 250 identifies the first channel, the second channel, and the first target audio data segment and the second target audio data segment.

The second segmentation module 350 divides the first target audio data segment into a plurality of the first audio frames according to a second-preset-number sampling points. The second target audio data segment is divided into a plurality of the second audio frames according to the same number of sampling points. The second calculation module 450 calculates the respective entropic value of each first and second audio frame. The restoration module 550 restores the hidden data according to such differences of the pairs of audio frames. For example, a pair of target audio data segments represents the first channel and the second channel. The first target audio data segment comprises three first audio frames A1, A2, and A3. The second target audio data segment comprises three second audio frames B1, B2, and B3. Audio frames A1 and B1 are a pairs of audio frames, as are audio frames A2 and B2, and audio frames A3 and B3.

In an exemplary embodiment, the second selection module 150 retrieves the pair of audio data segments from the pre-processed audio data of the multiple audio channels. The second selection module 150 determines whether each of the first and second target audio data segments carries the marker fields according to the preset marker field format. According to the original audio bit, the identification module 250 identifies the first channel and the second channel, as well as identifying the pair of target audio data segments which contain hidden data according to the data hiding bit.

The second segmentation module 350 divides the first target audio data segments into a plurality of first audio frames according to the second-preset-number sampling points. The second-preset-number is the same as the first-preset-number used in the encoding process. The second target audio data segments are divided into a plurality of second audio frames according to the second-preset-number sampling points. The second calculation module 450 calculates the entropic value of each first audio frame then the entropic value of each second audio frame to form a sequence of entropic values. The restoration module 550 uses subtraction to produce entropic differences of pairs of audio frames (each pair of audio frames being composed of a first audio frame and a second audio frame) to form an entropic differences sequence. The restoration module 550 restores the hidden data from the entropic differences sequence according to the rules set by the adjustment module 500 in encoding process. The processed and respective first and second target audio data segments are returned to the second audio buffer 90.

Figure 3:
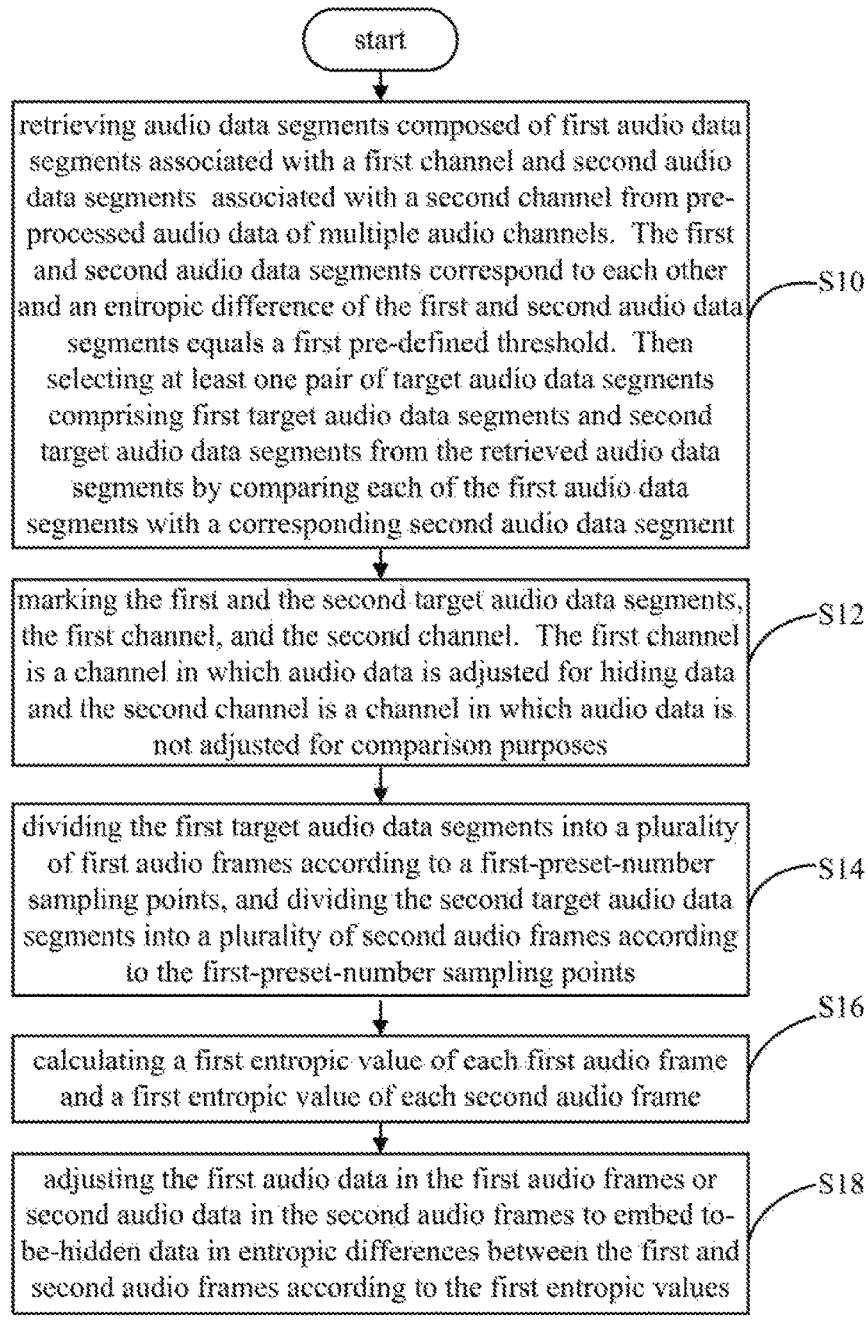
FIG. 3 illustrates a flowchart of an exemplary embodiment of an encoding method.

FIG. 3 is an exemplary embodiment of an encoding method. The encoding method is executed by a first electronic device.

At block S10, retrieving audio data segments composed of first audio data segments associated with a first channel and second audio data segments associated with a second channel from pre-processed audio data of multiple audio channels. The first and second audio data segments correspond to each other and an entropic difference of the first and second audio data segments equals a first pre-defined threshold. Then selecting at least one pair of target audio data segments from the retrieved audio data segments by comparing each of the first audio data segments with a corresponding second audio data segment, wherein the pair of target audio data segments comprise first target audio data segments and second target audio data segments. The pre-processed audio data of the first channel and the pre-processed audio of the second channel are stored in the first audio buffer. In the pair of target audio data segments, where the entropic difference between the first and second target audio data segments equals a second pre-defined threshold, the first and the second target audio data segments are considered similar.

At block S12, marking the first and the second target audio data segments, the first channel, and the second channel. The first channel is a channel in which audio data is adjusted for hiding data and the second channel is a channel in which audio data is not adjusted for comparison purposes.

At block S14, dividing the first target audio data segments into a plurality of first audio frames according to a first-preset-number sampling points, and dividing the second target audio data segments into a plurality of second audio frames according to the first-preset-number sampling points.

At block S16, calculating a first entropic value of each first audio frame and a first entropic value of each second audio frame.

At block S18, adjusting the first audio data in the first audio frames or second audio data in the second audio frames to embed to-be-hidden data in entropic differences between the first and second audio frames according to the first entropic values.

Figure 4:
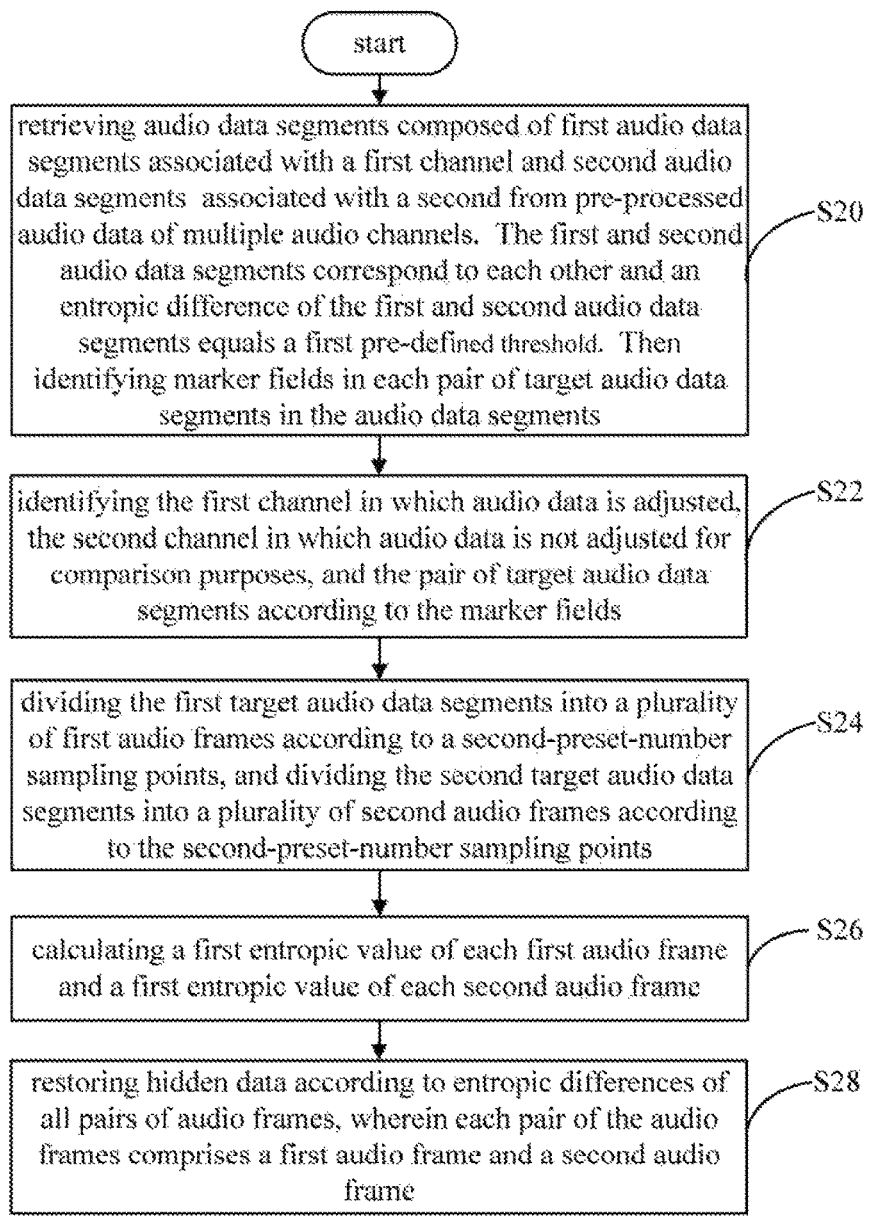
FIG. 4 illustrates a flowchart of an exemplary embodiment of a decoding method.

FIG. 4 is an exemplary embodiment of a decoding method. The decoding method is executed by a second electronic device.

At block S20, retrieving audio data segments composed of first audio data segments associated with a first channel and second audio data segments associated with a second from pre-processed audio data of multiple audio channels. The first and second audio data segments correspond to each other and an entropic difference of the first and second audio data segments equals a first pre-defined threshold. Then identifying marker fields in each pair of target audio data segments in the audio data segments. The pair of the target audio data segments comprises a first target audio data segment associated with the first channel and a second target audio data segment associated with the second channel, and the entropic difference of the first and second target audio data segments equals a second pre-defined threshold, the first and second target audio data segments are considered similar.

At block S22, identifying the first channel in which audio data is adjusted, the second channel in which audio data is not adjusted for comparison purposes, and the pair of target audio data segments according to the marker fields.

At block S24, dividing the first target audio data segments into a plurality of first audio frames according to a second-preset-number sampling points, and dividing the second target audio data segments into a plurality of second audio frames according to the second-preset-number sampling points.

At block S26, calculating a first entropic value of each first audio frame and a first entropic value of each second audio frame.

At block S28, restoring hidden data according to entropic differences of all pairs of audio frames, in which each pair of the audio frames comprises a first audio frame and a second audio frame.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claim.

What is claimed is:

1. An encoding method for processing audio data of multiple audio channels comprising a first channel and a second channel, the method comprising:

retrieving audio data segments from the audio data of the multiple audio channels, wherein the audio data segments comprise first audio data segments associated with the first channel and second audio data segments associated with the second channel, wherein the first and second audio data segments correspond to each other;

selecting at least one pair of target audio data segments from the audio data segments by comparing the first audio data segments with the second audio data segments, the pair of target audio data segments comprise a first target audio data segment associated with the first channel and a second target audio data segment associated with the second channel;

dividing the first target audio data segment into a plurality of first audio frames according to a preset-number of sampling points;

dividing the second target audio data segment into a plurality of second audio frames corresponding to the audio frames according to the preset-number of sampling points;

calculating entropic values of the first audio frames and the second audio frames;

embedding to-be-hidden data in entropic differences between the first and second audio frames according to the entropic values by adjusting first audio data of the first audio frames or second audio data of the second audio frames, wherein the embed data is part of the audio data of multiple audio channels, and the entropic differences are difference values between the entropic values of the first audio and second audio frames; and inserting a marker field into the first target audio data segments and the second audio data segments to mark the pair of target audio data segments, one channel of the first and second channels and the other channel of the first and second channels, wherein the marker field comprises a data hiding bit and an original audio bit.

2. The encoding method of claim 1, wherein the step of selecting target audio data segments further comprising:

comparing entropic values of the first audio data segments with entropic values of the second audio data segments; and selecting the pair of target audio data segments from the audio data segments according to the comparison result, wherein the pair of target audio data segments comprise the first and second target audio data segments.

3. A decoding method for processing audio data of multiple audio channels comprising a first channel and a second channel, and the method comprising:

retrieving audio data segments from the audio data of multiple audio channels, wherein the audio data segments comprise first audio data segments associated with the first channel and second audio data segments associated with the second channel;

identifying marker fields in at least one pair of target audio data segments from the audio data segments, wherein the pair of target audio data segments comprise a first target audio data segment associated with the first channel and a second target audio data segment associated with the second channel;

identifying the pair of target audio data segments having data being hidden, the first channel, and the second channel, according to the marker fields;

dividing the first target audio segment into a plurality of first audio frames according to a preset-number of sampling points;

dividing the second target audio segment into a plurality of second audio frames corresponding to the first audio frames according to the preset-number of sampling points;

calculating entropic values of the first audio frames and the second audio frames; and restoring the hidden data from entropic differences of all pairs of the audio frames, wherein each pair of the audio frames comprises a first audio frame and a second audio frame.

4. The decoding method of claim 3, wherein the step of identifying the pair of target audio data segments having data being hidden, the first channel, and the second channel, according to the marker fields, further comprising:

identifying the pair of target audio data segments having data being hidden according to a data hiding bit; and identifying a channel in which the audio data is adjusted and a channel in which the audio data is not adjusted according to an original audio bit.

5. An encoding system for processing audio data of multiple audio channels comprising a first channel and a second channel, the system comprising:

at least one processor;

a non-transitory storage system coupled to at least the one processor and configured to store one or more programs that are to be executed by the at least one processor, the one or more programs comprises instructions for:

retrieving audio data segments from the audio data of the multiple audio channels, wherein the audio data segments comprise first audio data segments associated with the first channel and second audio data segments associated with the second channel;

selecting at least one pair of target audio data segments from the audio data segments by comparing the first audio data segments with the second audio data segments, wherein the pair of target audio data segments comprise a first target audio data segment associated with the first channel and a second target audio data segment associated with the second channel;

dividing the first target audio data segments into a plurality of first audio frames according to a preset-number of sampling points;

dividing the second target audio data segments into a plurality of second audio frames corresponding to the first audio frames according to the preset-number of sampling points;

calculating entropic values of the first audio frames and the second audio frames;

embedding to-be-hidden data in entropic differences between the first and second audio frames according to the entropic values by adjusting first audio data of the first audio frames or second audio data of the second audio frames, wherein the embed data is part of the audio data of multiple audio channels, and the entropic differences are difference values between the entropic values of the first audio and second audio frames; and inserting a marker field into the first target audio data segments and the second target audio data segment to mark the pair of target audio data segments, the first channel, and the second channel, wherein the marker field comprises a data hiding bit and an original audio bit.

6. The encoding system of claim 5, wherein one or more programs comprises instructions for:

comparing entropic values of the first audio data segments with entropic values of the second audio data segments; and selecting the pair of target audio data segments from the audio data segments according to the comparison result, wherein the pair of target audio data segments comprise the first and second target audio data segments.

7. A decoding system for processing audio data of multiple audio channels comprising a first channel and a second channel, the system comprising:

at least one processor;

a non-transitory storage system coupled to at least the one processor and configured to store one or more programs that are to be executed by the at least one processor, the one or more programs comprises instructions for:

retrieving audio data segments from the audio data of multiple audio channels, wherein the audio data segments comprise first audio data segments associated with the first channel and second audio data segments associated with the second channel;

identifying marker fields in at least one pair of target audio data segments from the audio data segments, wherein the pair of target audio data segments comprising a first target audio data segment associated with the first channel and a second target audio data segment associated with the second channel;

identifying the pair of target audio data segments having data being hidden, the first channel, and the second channel, according to the marker fields;

dividing the first target audio segments into a plurality of first audio frames according to a preset-number of sampling points;

dividing the second target audio segments into a plurality of second audio frames corresponding to the first audio frames according to the preset-number of sampling points;

calculating entropic values of the first audio frames and the second audio frames; and restoring the hidden data from entropic differences of all pairs of the audio frames, wherein each pairs of the audio frames comprises a first audio frame and a second audio frame.

8. The decoding system of claim 7, wherein the one or more programs further comprise instructions for:

identifying the pair of target audio data segments having data being hidden according to a data hiding bit; and identifying a channel in which the audio data is adjusted and a channel in which the audio data is not adjusted according to an original audio bit.

* * * * *